United States Patent [19]

Fischer et al.

[11] Patent Number: 4,546,669
[45] Date of Patent: Oct. 15, 1985

[54] CONNECTING ROD MADE OF FIBER REINFORCED SYNTHETIC MATERIAL

[75] Inventors: Thomas Fischer, Augsburg; Bernd Bongers, Kirchheim, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 509,782

[22] Filed: Jun. 30, 1983

[30] Foreign Application Priority Data

Jul. 7, 1982 [DE] Fed. Rep. of Germany ....... 3225323

[51] Int. Cl.⁴ ................................ F16C 7/02
[52] U.S. Cl. .................. 74/579 E; 74/579 R; 29/156.5 A; 123/197 AB
[58] Field of Search ............ 74/579 R, 579 E, 579 F, 74/581, 44; 29/156.5 A; 123/90.39, 197 R, 197 AB, 197 AC; 92/187; 428/105, 107, 108, 109, 113, 910

[56] References Cited

U.S. PATENT DOCUMENTS

| 3,144,786 | 8/1964 | Dale | 74/579 E |
| 4,216,682 | 8/1980 | Ban et al. | 74/579 E |
| 4,329,915 | 5/1982 | Schulz | 29/156.5 A |
| 4,341,826 | 7/1982 | Prewo et al. | 428/113 |
| 4,403,525 | 9/1983 | Bongers | 74/579 E |
| 4,414,860 | 11/1983 | Brunsch et al. | 74/579 E |
| 4,425,820 | 1/1984 | Swozil | 74/579 E |

FOREIGN PATENT DOCUMENTS

| 864172 | 1/1953 | Fed. Rep. of Germany . | |
| 2951112 | 7/1981 | Fed. Rep. of Germany . | |
| 3004575 | 8/1981 | Fed. Rep. of Germany . | |
| 554696 | 1/1957 | Italy | 74/579 E |
| 599722 | 11/1959 | Italy | 74/579 E |
| 57-97912 | 6/1982 | Japan | 74/579 R |

*Primary Examiner*—Gary L. Smith
*Assistant Examiner*—Vinh Luong
*Attorney, Agent, or Firm*—W. G. Fasse; D. H. Kane, Jr.

[57] ABSTRACT

A connecting rod has a closed bearing at one end for connecting, for example, a piston bolt to the rod. At the other end the rod has a divided bearing for connecting, for example, a crankpin to the rod. The rod is made of fiber reinforced synthetic materials. The divided bearing is enclosed by an inner and an outer bearing bail and by the free ends of a fiber reinforced loop which surrounds the closed bearing. At the divided bearing end the rod components are interlocked in a dovetail manner. The loop is an open loop and the free ends of the loop legs extend substantially in parallel to the longitudinal axis of the rod.

9 Claims, 7 Drawing Figures

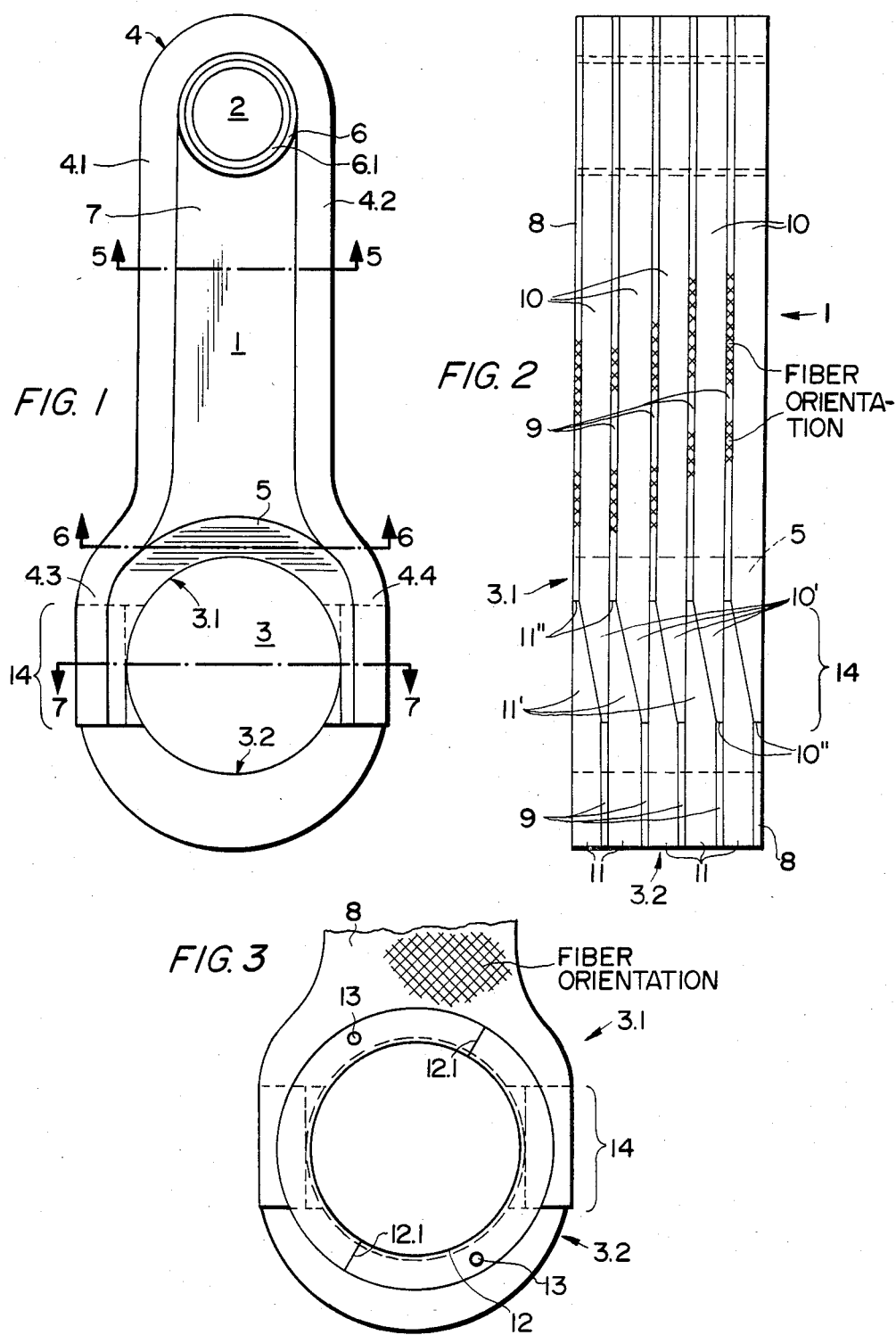

CONNECTING ROD MADE OF FIBER REINFORCED SYNTHETIC MATERIAL

BACKGROUND OF THE INVENTION

The present invention relates to a connecting rod made of fiber reinforced synthetic material. Such rods are, for example, used as crankshaft rods, whereby one rod head or rod end is connected, for example, to a piston bolt by means of a closed cylindrical bearing while the other rod end or rod head is connected, for example, to a crankpin by means of a divided cylindrical second bearing. The second bearing is formed by the divided big end of the rod constructed as a half shell coorperating with a substantially mirror-symmetrically shaped second half shell forming an outer bearing cover bail. These components are held together by a loop of unidirectionally oriented fiber strands looping around the closed bearing cylinder, whereby the fiber strands extend in the longitudinal direction of the rod. The bearing cover bail is secured to the free ends of the loop forming fiber strands.

German Patent Publication (DE-OS) No. 3,004,575 discloses a crankshaft rod of the type described above. The crankpin bearing of such a rod is divided for assembly or mounting reasons. The known crankshaft rod has a core of synthetic material encased by a metal jacket. Such a structure has, compared to a full metal construction, a substantially smaller mass or weight and hence using such crankshaft rods results in an increased or improved quiet run and an improved efficiency of the respective engine, especially if high r.p.m. stroke piston engines are involved. The ideal solution under such operating conditions is to avoid any type of metal components. However, by omitting merely the metal jacket in the prior art crankshaft rod, the result would be, among others, that the required strength relative to compression and tensile forces or stress is not assured anymore. The remaining fiber loop which is only capable of taking up tensile stress would buckle in response to compression stress. Another undesirable feature of such prior art rods which comprise a metal jacket, is seen in that the load distribution is uneven. The metal jacket which functions, among its other functions, as a supporting outer shell of the fiber loop is not fully utilized because the compound or interaction of two materials each having a different modulus of elasticity is not ideal when the crankshaft rod is under load conditions. Under such conditions the stiffer fiber reinforced material is subjected to most of the loads while the supporting outer metal jacket is not fully utilized.

OBJECTS OF THE INVENTION

In view of the above it is the aim of the invention to achieve the following objects singly or in combination:
to construct a connecting rod of the type described above which does not require any metal components while still assuring the required strength characteristics;
to assure the required strength characteristics relative to all load conditions resulting in tensile stress, compression stress, and shearing stress;
to avoid the use of an endless fiber loop in the construction of such connecting rods;
to provide a special interlocking between the free ends of the legs of an open ended fiber loop and a bearing cover bail of fiber compound material; and
to use an adhesive bond between all fiber compound components of the connecting rod which bond may be subjected to high dynamic loads.

SUMMARY OF THE INVENTION

The connecting rod according to the invention employs an open fiber loop having legs with free ends reaching toward the divided bearing. The free ends of the fiber loop legs are joined to an inwardly disposed bearing bail also made of fiber compound material in which the fibers are unidirectionally arranged with regard to the bail configuration or bail extension. A compression rod is operatively interposed between the above mentioned closed cylindrical bearing and the inwardly disposed bearing bail on the one hand, and between the legs of the fiber loop. The compression rod is also made of fiber strands extending at least in one direction in parallel to the longitudinal axis of the connecting rod. The free ends of the loop legs and the inwardly disposed bearing bail are then joined to an outer bearing cover forming bail by a dovetailing type arrangement in which the various fiber strands or layers overlap each other in a dovetail manner. Preferably, the connection strength is achieved by an adhesive bonding between all the elements participating in the dovetail structure.

Thus, the invention employs in addition to the rod which takes up compression loads the inwardly disposed bearing bail which contributes greatly to a sufficient strength of the connecting rod relative to shearing stress resulting from cross forces generated by mass accelerations when the rod is under operating conditions. This sufficient strength is especially achieved for the connection between the fiber loop and the compression rod because the inwardly disposed bail which couples the free ends of the loop legs of the fiber loop to each other in a force transmitting manner permits using an open ended loop in the first place, thereby avoiding the multi-bends of an endless fiber loop heretofore necessary in the area of the open rod head, usually the big end of a crankshaft rod. The use of such an inwardly disposed bail practically leaves it free how the loop leg ends should be oriented or arranged relative to the interconnecting joints between the open rod end portion and the bearing cover bail. This feature has the advantage that it is possible to provide a material interlocking between the components forming the open end of the connecting rod. Such material interlocking in turn increases the connection strength and safety when mounting a crankshaft rod. Such connecting strength may be further enhanced simply by interposing extra layers at the junction, if desired.

Such a layered construction in the zone of the big end of a crankshaft rod greatly facilitates achieving the desired dynamic high load adhesive bond connection between the open rod head portion and the bearing cover bail. This high strength connection is even further enhanced by the layered dovetailing construction which assures an optimal breaking strength of such rods.

BRIEF FIGURE DESCRIPTION

In order that the invention may be clearly understood, it will now be described, by way of example, with reference to the accompanying drawings, wherein:
FIG. 1 is an elevational side view of a connecting rod according to the invention illustrating a crankshaft rod;

FIG. 2 is a side elevational view of the rod according to FIG. 1;

FIG. 3 shows the lower big end of a crankshaft rod, as in FIG. 1, however, with a bearing shell inserted into the big end of the rod;

DETAILED DESCRIPTION OF A PREFERRED EXAMPLE EMBODIMENT AND OF THE BEST MODE OF THE INVENTION

Figure 4:
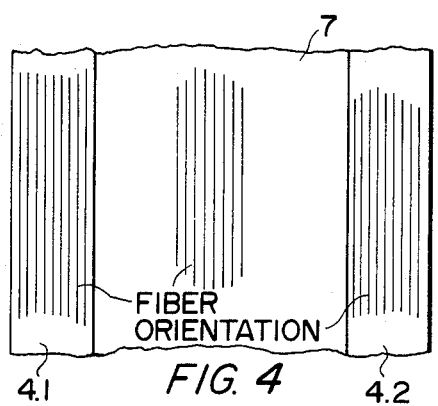
FIG. 4 shows on an enlarged scale, relative to FIG. 1, the fiber orientation in the loop legs and in the compression rod.

FIGS. 1 and 2 show a connecting rod in the form of a crankshaft rod having a shaft 1, a small end bearing 2 and a big end bearing 3. The small end bearing 2 is, for example, connectable to a piston bolt while the bearing 3 is connectable to a crankshaft pin. The bearing 2 is a closed cylindrical bearing, while the bearing 3 is a divided bearing to facilitate the connection of the big end to a crankshaft. For this purpose, the big end is divided into an inwardly disposed bearing bail 5 and into an outwardly disposed bearing cover bail 3.2. The rod further comprises an open ended loop 4 of fiber compound material having loop legs 4.1 and 4.2 with free loop leg ends 4.3 and 4.4. These leg ends 4.3 and 4.4 form together with the inwardly disposed bearing bail 5 one half of the divided rod end 3.1, the other half of which is formed by the outer bearing cover bail 3.2. The rod end 3.1 and the outer cover bail 3.2 are shaped to form respective half shells which receive the bearing proper shown in FIG. 3. The orientation of the fibers in the open loop 4 and in the loop legs 4.1 and 4.2 is unidirectional substantially in parallel to a longitudinal vertical axis of the rod as shown in FIG. 4. The fiber compound material of all components comprises, for example, carbon fibers embedded in a synthetic resin matrix, whereby all metal components for connecting purposes have been avoided. Yet, the connecting rod according to the invention has not shown any diminishing in its required strength. The free ends 4.3 and 4.4 extend in parallel to the shaft 1 and therefore make it possible to provide a dovetailing construction with the force transmitting bail 5 and with the outer cover bail 3.2. The inwardly disposed bearing bail 5 is also made of unidirectionally oriented fiber strands extending from one free end 4.3 to the other free end 4.4 of the fiber loop 4. The horizontal lines in the inwardly disposed bearing bail 5 indicate the unidirectional fiber orientation as shown in FIG. 1.

The space between the loop legs 4.1 and 4.2 is taken up by a compression rod 7 embedded between the legs 4.1 and 4.2 and extending between a bearing cylinder 6 and the inwardly disposed bearing bail 5. The loop 4 loops around the bearing cylinder 6 which may comprise a bearing shell or bushing 6.1 made of metal. The compression rod or member 7 is also made of fiber compound material in which the fiber strands have a unidirectional orientation in parallel to the longitudinal axis of the connecting rod. This compression member makes sure that the connecting rod is capable of taking up compression loads.

The bearing cylinder 6 may, for example, comprise a wound body of fiber compound material with the above mentioned metal shell or bushing 6.1. The fiber orientation in the wound body of the cylinder 6 is preferably such that in one layer the fibers extend at 90° relative to the fiber orientation in another layer so that one set of fibers extends in parallel to the longitudinal bearing axis of the bearing 2 while another set extends at 90° to such bearing axis which itself extends perpendicularly to the plane of the drawing of FIG. 1.

The outer bearing cover bail 3.2 is also made of fiber compound material in which the fiber strands are oriented unidirectionally from one end to the other of the cover bail 3.2.

FIG. 2 illustrates the increasing of the shearing strength and bending stiffness of the entire fiber structure of the crankshaft rod by the use of outer cover layers 8 and intermediate layers 9. The cover layers 8 and the intermediate layers 9 are made of fiber compound material preferably having a ±45° fiber orientation as shown in FIGS. 2 and 3. The fibers in the layers 8 and 9 may be provided in the form of respective webbings or ply type fiber structures. The layers 8 and 9 extend in parallel to the legs 4.1 and 4.2 of the loop 4. The intermediate layers 9 divide the loop and the loop legs, as well as the inwardly disposed bail 5 and the compression rod 7, as well as the outer bearing cover bail 3.2 in the longitudinal direction as shown by the layered structure of FIG. 2.

According to the invention a high strength connection is achieved between the open rod portion 3.1 and the outer bearing cover bail 3.2 by combining an adhesive bond with a dovetailing arrangement between the just mentioned components when the latter are assembled during the mounting of the crankshaft rod. For this purpose the unidirectional fiber strand layers 10 of the free ends 4.3 and 4.4 of the loop legs 4.1 and 4.2 and the unidirectional fiber layers 11 of the cover bail 3.2 are provided with matching slanting, wedge type ends 10' and 11' respectively which are spliced in a dovetail type of arrangement in the zone 14. The arrangement is such, that each wedge 10' has a blunt end 10" and that each wedge 11' has a blunt end 11", whereby these blunt ends form an abutment joint with the respective outer cover layer 8 or with the respective inner dividing layer 9. It has been found, that this type of dovetail joint in the overlapping zone 14 provides an optimal strength characteristic due to utilizing an optimal interface or surface area between the surfaces bonded to each other by an adhesive. Further, a unidirectional fiber layer contacts a fiber layer with a cross-over fiber relationship at these abutment joints 10" and 11". Along the slanted surface areas where the splicing takes place, the surface contact between the unidirectional fibers of the layers 10 and 11 is also optimized.

The slanted dovetailing has been found to provide a splicing of superior load transmission strength. However, where a connecting rod is not required to provide a large load transmission strength, it is sufficient to use a squared off abutment joint between the unidirectional fiber layers of the loop and of the bails 3.2 and 5 while making sure that the cover layers and intermediate layers 8,9 overlap the unidirectional fiber layers 10, 11.

Due to the use of an adhesive for the bonding it may be desirable to provide a divided bearing sleeve 12 which may, for example, be made of metal. The bushing or sleeve 12 has laterally extending flanges and the two portions of the sleeve 12 face each other along a dividing plane 12.1 which according to the invention is angularly displaced relative to the dividing zone 14 for preventing any adhesive from entering into the bearing proper through the separation plane or gap 12.1. This feature effectively prevents any adhesive from soiling the bearing surfaces during the assembly operation. Preferably, the two half shells forming the sleeve 12 are fixed in their angularly displaced position relative to the dovetailing zone 14 by arresting pins 13 extending through the flange of the sleeve 12 into the respective portion of the big end of the rod.

Figure 5:
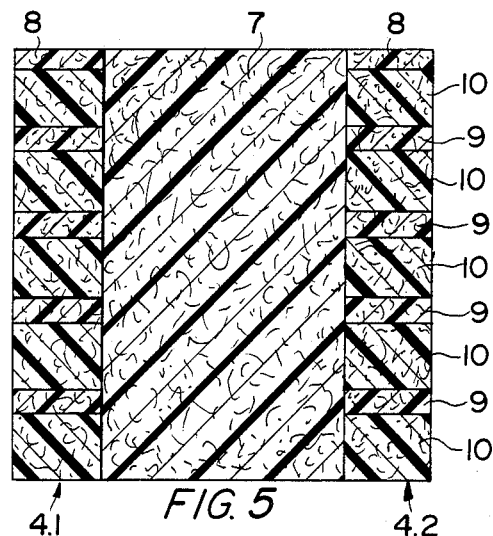
FIG. 5 is a sectional view along section line 5—5 in FIG. 1 to illustrate the fiber construction.
Figure 6:
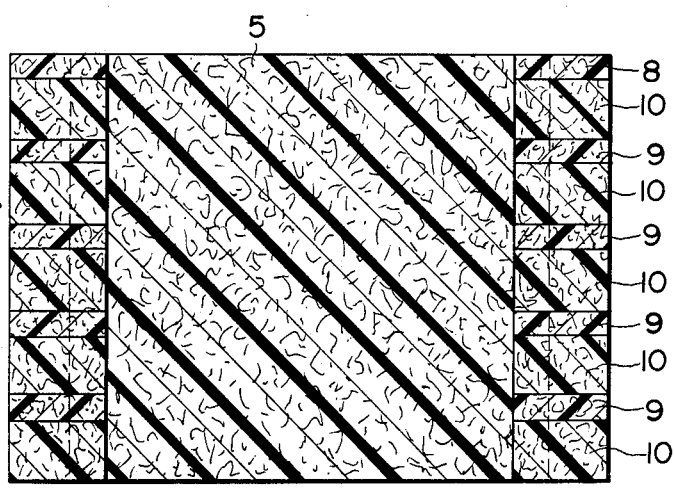
FIG. 6 is a sectional view along section line 6—6 in FIG. 1 to illustrate the fiber construction.
Figure 7:
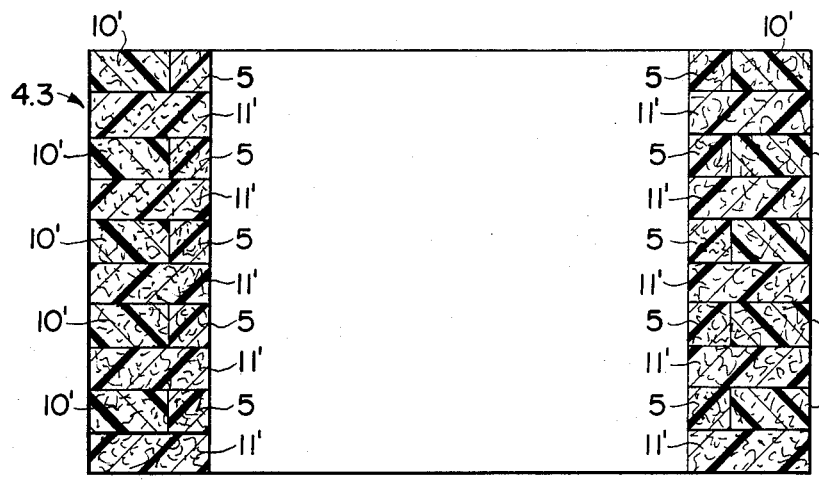
FIG. 7 is a sectional view along section line 7—7 in FIG. 1 to illustrate the fiber construction.

FIGS. 5, 6, and 7 show on an enlarged scale, relative to FIG. 1, the various sectional views indicated in FIG. 1 by the respective section lines 5—5, 6—6, and 7—7 to illustrate the multilayer fiber structure of the present piston rods which is also apparent from FIG. 2.

Although the invention has been described with reference to specific example embodiments, it will be appreciated, that it is intended to cover all modifications and equivalents within the scope of the appended claims.

Incidentally, an adhesive suitable for the present purposes is known as liquid adhesive EC 2214 HT made by 3M-Company.

What is claimed is:

1. A connecting rod made of fiber reinforced synthetic material and having a longitudinal rod axis, comprising a first rod head at one end of the rod, said first rod head including a cylindrical closed bearing (6), a second rod head at the other end of the rod, said second rod head forming a divided bearing inclduing an inwardly disposed bearing bail (5) made of a material with unidirectionally oriented fiber strands extending substantially in longitudinal direction of said inwardly disposed bearing bail and an outwardly disposed bearing cover bail (3.2), said rod further comprising an open loop (4) also made of material with unidirectionally oriented fiber strands looping around said closed bearing and forming two loop legs (4.1, 4.2) having free ends reaching below a center of said second bearing, and a compression member (7) made of fiber strands oriented substantially in parallel to said longitudinal rod axis, said compression member (7) extending lengthwise between said closed bearing (6) and said inwardly disposed bearing bail (5) and laterally between said loop legs (4.1, 4.2), and first overlapping dovetailing means between said free loop leg ends and said outwardly disposed bearing cover bail for interconnecting the loop leg ends with the outwardly disposed bearing cover bail, said overlapping dovetailing means between said inwardly disposed bearing bail (5) and said outwardly disposed bearing cover bail (3.2) for interconnecting said inwardly and outwardly disposed bearing bails to each other, whereby said outwardly disposed bearing bail overlaps said free loop leg ends and said inwardly disposed bail for enclosing said second divided bearing (3) without any connecting bolts between said loop leg ends and said outwardly disposed bearing cover bail.

2. The rod of claim 1, further comprising adhesive means between said free loop leg ends, said inwardly disposed bearing bail, and said outwardly disposed bearing cover bail for providing a required connection strength of said first and second overlapping dovetailing means.

3. The rod of claim 1, further comprising outer facing layers (8) of fiber reinforced material covering said loop and the loop legs, said inwardly disposed bail (5), said compression member (7), and said bearing cover bail (3.2), and inner dividing layers (9) of fiber reinforced material dividing said loop and the loop legs, said inwardly disposed bail (5), said compression member (7) and said bearing cover bail (3.2), said outer facing layers (8) and said inner dividing layers (9) having a cross-over fiber orientation.

4. The rod of claim 3, further comprising layers (10, 11) of material with unidirectionally oriented fibers embedded between said facing layers (8) and said dividing layers (9) for forming said loop, said loop legs, said inwardly disposed bearing bail, and said outwardly disposed bearing cover bail, said dovetail means comprising an abutment joint between layers (10, 11) with said unidirectionally oriented fibers and a respective outer facing layer (8) and between layers (10, 11) with said unidirectionally oriented fibers and a respective dividing layer (9).

5. The rod of claim 1, wherein said cylindrical closed bearing (6) comprises a bearing cylinder made of fiber reinforced material in which the fibers are arranged in a cross-over relationship.

6. The rod of claim 5, wherein said bearing cylinder has a longitudinal cylinder axis and wherein said cross-over relationship comprises fibers arranged in parallel to said longitudinal cylinder axis and fibers arranged at 90° to said longitudinal cylinder axis.

7. The rod of claim 1, further comprising a divided tie bushing (12) inserted in said divided bearing, said divided tie bushing (12) having a dividing plane, said divided bearing having a dividing zone defined by said dovetail means, said dividing plane and said dividing zone being angularly displaced relative to each other.

8. The rod of claim 7, wherein said dividing tie bushing (12) has lateral flanges, said rod further comprising stop pins (13) extending through said lateral flanges for assuring that dividing plane and the dividing zone stay angularly displaced relative to each other.

9. The rod of claim 1, wherein said first and second dovetailing means comprise wedge shaped elements with slanted interacting surfaces for optimizing the interacting surface contact between adjacent wedge shaped elements.

* * * * *

UNITED STATES PATENT AND TRADEMARK OFFICE
CERTIFICATE OF CORRECTION

PATENT NO. : 4,546,669
DATED : October 15, 1985
INVENTOR(S) : Thomas Fischer, Bernd Bongers It is certified that error appears in the above—identified patent and that said Letters Patent is hereby corrected as shown below:

Claim 1, line 6, (column 5, line 31) replace "inclduing" by --including--, line 9, (column 5, line 34) after "in" insert --a--, line 21, (column 5, line 46) replace "dovertailing" by --dovetailing--, line 25, (column 5, line 50) replace "said" (first occurrence) by --second--.

Signed and Sealed this

Twenty-fourth Day of December 1985

[SEAL]

Attest:

DONALD J. QUIGG

Attesting Officer    Commissioner of Patents and Trademarks